US006847731B1

(12) United States Patent
Caulfield

(10) Patent No.: US 6,847,731 B1
(45) Date of Patent: Jan. 25, 2005

(54) METHOD AND SYSTEM FOR IMPROVING PATTERN RECOGNITION SYSTEM PERFORMANCE

(75) Inventor: H. John Caulfield, Cornersville, TN (US)

(73) Assignee: Northeast Photo Sciences, Inc., Hollis, NH (US)

( * ) Notice: Subject to any disclaimer, the term of this patent is extended or adjusted under 35 U.S.C. 154(b) by 650 days.

(21) Appl. No.: 09/633,330

(22) Filed: Aug. 7, 2000

(51) Int. Cl.[7] .................................................. G06K 9/62
(52) U.S. Cl. ..................................... 382/159; 382/225
(58) Field of Search ................................. 382/155–161, 382/170, 190, 210, 280, 224, 225, 228; 359/29, 559; 706/12, 14, 16, 18, 20, 25; 700/47, 48, 50, 51

(56) References Cited

U.S. PATENT DOCUMENTS

| | | | | |
|---|---|---|---|---|
| 3,993,976 A | * | 11/1976 | Ginsburg | 382/211 |
| 4,975,975 A | | 12/1990 | Filipski | 382/227 |
| 5,479,523 A | | 12/1995 | Gaborski et al. | 382/159 |
| 5,537,488 A | | 7/1996 | Menon et al. | 382/170 |
| 5,581,634 A | | 12/1996 | Heide | 382/226 |
| 5,602,938 A | * | 2/1997 | Akiyama et al. | 382/155 |
| 5,608,620 A | | 3/1997 | Lundgren | 705/1 |
| 5,636,371 A | | 6/1997 | Yu | 703/26 |
| 5,649,068 A | | 7/1997 | Boser et al. | 706/12 |
| 5,649,070 A | * | 7/1997 | Connell et al. | 706/14 |
| 5,754,681 A | * | 5/1998 | Watanabe et al. | 382/159 |
| 5,796,924 A | * | 8/1998 | Errico et al. | 706/25 |
| 5,903,884 A | * | 5/1999 | Lyon et al. | 706/25 |
| 5,966,460 A | * | 10/1999 | Porter et al. | 382/159 |
| 6,092,059 A | * | 7/2000 | Straforini et al. | 706/14 |
| 6,513,025 B1 | * | 1/2003 | Rosen | 706/45 |

OTHER PUBLICATIONS

Fu, K.S., et al., "Pattern Recognition and Computer Vision", *Computer*, IEEE Computer Society, Oct., 1984.

* cited by examiner

Primary Examiner—Mehrdad Dastouri
Assistant Examiner—Virginia Kibler
(74) Attorney, Agent, or Firm—Perkins Smith & Cohen LLP; Jerry Cohen; Jacob N. Erlich

(57) ABSTRACT

Stand-alone or assistive pattern recognition system and process enabling error free classification of all objects in a training set and application to unclassified objects. Parameters and/or features of the data objects in a training set are selected and measured, from which discriminants are computed. The measured data is plotted in discriminant space and decision boundaries or thresholds determined, preferably such that at least one object from one class is isolated from the remaining objects, removed from the training set, and the process repeated until an acceptable number of unclassified objects remain. The system can be applied sequentially to classify all the members of the training set belonging to one class and then applied to objects in other classes. Fuzzy quantifiable determinations of an object's likelihood of class membership can be made. Objects' positions and classifications are obtainable in an optical system using Fourier techniques without limitation to linearly discriminable problems.

13 Claims, 13 Drawing Sheets

METHOD AND SYSTEM FOR IMPROVING PATTERN RECOGNITION SYSTEM PERFORMANCE

FIELD OF THE INVENTION

The present invention relates to pattern recognition systems, and, more particularly to methods and systems for improving the performance of such systems.

BACKGROUND OF THE INVENTION

Pattern recognition systems have been designed and built for everything from character recognition, target detection, medical diagnosis, analysis of biomedical signals and images, remote sensing and identification of human faces and fingerprints, to reliability, socio-economics, archaelogy, speech recognition, machine part recognition and in industrial applications such as automatic inspection of industrial products such as semiconductor chips for defects.

As well known in the art, pattern recognition often begins with some kind of preprocessing to remove noise and redundancy in measurements taken from physical or mental processes to ensure an effective and efficient pattern description. Next, a set of characteristic measurements, numerical and/or non-numerical and relations among these measurements are extracted to represent patterns. The patterns are then analyzed (classified and/or described) on the basis of the representation.

The process of pattern recognition involves analyzing pattern characteristics as well as designing recognition systems. Many mathematical methods have been offered for solving pattern recognition problems but all are primarily either decision theoretic (statistical) or syntatic (structural). In the decision-theoretic approach, N features or an N-dimensional feature vector represents a pattern, and decision making (and structural analysis) is based on a similarity measure that, in turn, is expressed in terms of a distance measure, a likelihood function or a discriminant function. In the syntactic approach, a pattern is represented as a string, a tree or a graph of pattern primitives and their relations. The syntactic approach draws an analogy between the structure of patterns and the syntax of a language and the decision making (and/or structural analysis) is in general a parsing procedure.

Typically, pattern recognition systems utilize a "training" phase and a "recognition" phase. During the training phase, information representative of distinctions among pattern (e.g. character) types is gathered from a set of training samples of patterns whose proper classification is known (i.e. training set) and stored in a computer's memory in the form of numerical parameters and data structures. During this phase, the selected pattern recognition system is tuned to the training set.

It is a universal characteristic or feature of all pattern recognition systems that a decision rule must be determined. When the rule is then applied to the members of the training set, it should allow perfect classification of all members. In the prior art, a single pattern recognition (classifier) component is normally trained to perform the entire classification for the entire universe of patterns to be recognized. To improve classification accuracy, one system utilizes a hierarchy of recognition components trained to perform the entire classification of all patterns. This system is disclosed in U.S. Pat. No. 4,975,975 issued on Dec. 4, 1990. While this system improved accuracy, it still requires repeating the entire training procedure for each of the recognition components until all of the components required to properly classify all members determined by the first recognition component as being in the class. Moreover, the system is not designed to perform error free decision making.

Typically applying pattern recognition to real problems involves these steps:

1. taking data from samples or objects of the various classes, interferants, etc. and forming features therefrom, the data may be of virtually any parameter,
2. selecting one or more discriminants, where a discriminant is a function of the data and/or features,
3. training the discriminants by plotting the measured data in discriminant space, and
4. applying a decision rule by selecting decision boundaries from step 3 and using the discriminants and decision boundaries for classifying a new sample from new data taken therefrom.

The combination of those four steps determines how well the pattern recognizer works, so improvements in one can be used to either improve overall performance or achieve similar performance with one or more of the unimproved steps actually degraded.

One well known method is the Principal Component Analysis (PCA) which combines the above steps 1, 2 and 3. In this review, attention is drawn to linear discriminants $d_1$, $d_2$. Using PCA an optimum linear discriminant for the data may be computed from the data vector x using a weight vector w, according to $$d_1 = w_1^T x. \tag{1}$$

A new data point is subjected to that same inner product with $w_1$ to give a number that is called the "first principal component."

Next a second linear discriminant weight vector $w_2$ is selected which is subject to the constraint that $$w_1^T w_2 = 0. \tag{2}$$

Usual embodiments make:

$$w_i^T w_i = 1 \text{ for all i}. \tag{3}$$

The general relationship becomes where the exponent T is the transposition of rows and columns.

Thus orthonormality condition assures that the information used in the second discriminant is orthogonal to that in the first, etc. A logical limitation of the PCA approach is that once a discriminant has correctly identified some of the items it is unnecessary to apply a second discriminant to those items.

The data are plotted in d space and good decision boundaries found. Because each discriminant uses all of the data optimally subject to the constraint that each must add totally new information, PCA is widely considered as good as can possibly be done using linear discriminants. However, this method is complex in practice and will not guaranty that the training set is classified error free.

Other prior art classifiers use a nearest neighbor method, well known in the art, where it is possible to classify all members of a training set error free. But as training sets become large this approach becomes complex and cumbersome. This approach has another limitation in that the discriminants used are not the minimum necessary to classify all the members of the training set.

Fourier filtering is of interest both within optics and within electronics, because it allows targets to be recognized and located in parallel. This is referred to as shift invariance.

However, a limitation of this filter is that it is applicable only to problems solvable with a linear discriminant and therefore inadequate for most real applications. So, if a distribution of objects in different classes were not linearly discriminable, Fourier filters were not used. But with the advances and availability of fast electronic chips and fast optical method for Fourier transforms, this technique becomes very attractive if the above limitation is overcome.

For virtually all the known pattern recognition systems and techniques described above, it should be noted that not all choices of the discriminant and threshold are of equal usefulness even in the linearly separable cases. If the separation in the discriminant space of the items in the one class from the remaining items is small, clearly, the sensitivity to small perturbations is far greater than in a case when the separation is large. Stated more conventionally, one choice leads to greater robustness or generalizability than the other.

As referenced above there are many installed pattern recognition systems in a wide variety of applications. Most of these applications have compiled large amounts of data, derived many useful features and have applied many different algorithms that produce some level of satisfaction. But, these systems produce errors when analyzing new data, and improved performance is desirable. However, improvements that require significant investments in time, people and money are often not available to the users. There is a continuing general need in the field to develop techniques that supplement these installed applications making use of the developed data, features, algorithms and techniques while improving the performance thereof.

It is an object of the present invention to provide a pattern classifier that can be used to supplement other pattern recognition systems thereby improving performance.

It is a further object of the present invention to provide a training method for improving performance of existing pattern recognition systems.

It is an object of the present invention to classify error free all members of a training set.

Another object of the present invention is to provide a minimum number of discriminants for error free classification of the training set.

It is still yet another object of the present invention to provide fuzzy (as well as crisp) pattern classifiers.

It is an object of the present invention to design and apply Fourier filters to linear and nonlinearly discriminable problems.

It is yet another object of the present invention to make the system as robust as possible relative to new samples not in the training set by providing significant margins for use on new data items.

SUMMARY OF THE INVENTION

The above objects are achieved with a method for training a pattern recognition system through the use of the inventive training procedure, and with a corresponding pattern recognition system and method for classifying unclassified new objects. The training procedure of present invention involves taking data measured from the objects in a training set, determining or computing a discriminant value, defining a discriminant space, plotting the value in the discriminant space, selecting a decision boundary (threshold) or boundaries thereupon, and providing a decision rule that isolates and correctly classifies at least one object of the training set. The correctly classified object is removed from the training set and the above process is repeated for the reduced training set until all, or some acceptable number of, the objects have been correctly classified. In this manner: data, discriminants, decision boundaries, decision rules and the corresponding sequence are all determined and applicable to unclassified new objects. It should be noted that the same discriminant can be used in the repetitions, but with new decision boundaries.

In a preferred embodiment, when the above sequential decisions are of the same type, that is where each decision correctly classifies objects of the same class from the training set, until a last determination has correctly classified the last object of that class, then the discriminants and decision boundaries can be applied in parallel. Such an operations allows the entire training set and the outputs of each decision to be "ored" together to correctly classify all the objects, error free, in that entire class simultaneously.

For the purposes of this invention the discriminant space may be one dimensional, whereupon the corresponding decision boundary and threshold are points, or the discriminant may be multidimensional whereupon a decision boundary may be a line, surface or other such corresponding multi-dimensional surface. Moreover a measured parameter of an object may be virtually any measureable parameter and/or feature, like "curved line" or a combination of such features. A decision boundary may be selected that separates out at least one or more correctly classified objects from the training set as plotted in the discriminant space. When a new object is introduced for classification by the present invention, data is taken and plotted in the discriminant space and an algorithm or similar operation determines if the plotted point is on one side or another side of the decision boundary. This algorithm or similar operation will be termed a "decision rule."

As discussed above, the training procedure is repeated by presenting an ever shrinking training set to the inventive classifier system for determining error-free classifications until one of two termination states or conditions is reached. The first state corresponds to a perfect (i.e. training set allows perfect error free classification of all such members) or pre-established acceptable good result. The second state corresponds to a perfect "non-classification" result wherein despite having differing labels, the input data patterns and the analysis of such patterns by the classifier are unable to distinguish among the members of the residual reduced training set.

The above description also applies, in a preferred embodiment, as a system and method for improving the performance of an existing pattern recognition system. In this case the discriminants used in the existing recognition system are used but new decision boundaries (or thresholds) are determined so that the training set is classified error free. Another preferred embodiment of the present invention is to accept the "errors" from the existing recognizer, and use them as a training set for the above described inventive process wherein the "errors" are classified error free.

Following the application of the original training set and reduced training set; the system performs a test for determining if all of the members of the training set have been properly classified. In the absence of proper classification of all members of the applied training set, the system iteratively generates a further reduced training set which is then applied to the classification component for determining a further new decision rule which further reduces the unclassifed objects in the training set.

At this point, as a matter of choice, the system can determine if it is possible to add measurements, change the analysis methods or merely accept the errors of the recognition system. The discriminants, decision boundaries, decision rules and algorithms applicatable to the recognition system are determined during the training phase through the application of an ever shrinking training set. The recognition system is ready for identifying new unclassified objects. The present invention provides for both the sequential successive application and, for some problems, the parallel independent application of the recognition system to the unclassified objects supported by the training set. When the sequential system is used the classified objects are accumulated sequentially. When the decision rules are independently applied, the results of such application are logically "ored" and the objects are classified at the same time.

The present invention may be used to advantage when the discriminant spaces and decision boundaries are used to determine maximums and/or minimums rather than exact logical determinations. When so applied the results indicate the "relative strength of" rather than absolute classifications. Such cases are referred to as fuzzy herein.

The present invention is advantageously applicable to three or more classes. A preferred embodiment approach is to separate sequentially one class from all others and then continue sequentially to separate each class separately. However, parallel classifications and combinations of sequential and parallel operations may also be implemented with the present invention.

A preferred embodiment approach to increasing the robustness of the recognition systems is to erect a margin or "guard band" around the decision boundary or threshold. A very robust system is a measure of the "distance" that the boundary would have to move (the margin) to include the nearest object that would be an instance of error. The width of that band is a figure of merit for generalizability of the discriminant and decision boundary and wider margins offer more system robustness.

The present invention can be used to advantageous, in another preferred embodiment, using Fourier filters or masks where each such filters can be trained independently. As with the other pattern recognition applications, using Fourier filters the present invention can be applied to training sets to classify the objects error free. The various filters can be used, as with other preferred embodiments of the present invention, in sequence and in parallel with respect to the filtering operations. A brief review for a better understanding of the present invention with Fourier Optics follows. In a typical system, a coherent light shines through a film or patterned object, or some other method for producing a spatial pattern onto a laser beam, thereby producing an image. An optical lens system creates a Fourier transform of the image. A mask or filter is introduced and the filtered result is transformed back by another optical lens into an output image (inverted and convolved with the filter). That output image optical amplitude may be detected by known devices, diode arrays or charge coupled devices (CCD's). The output of the detector may be thresholded to determine when a signal represents a particular object of interest. An important advantage of Fourier optics as described herein is that the locations of the objects of interest is preserved. Using the present invention, a first filter may be designed that separates out object of one class from another using a threshold. In the present invention that threshold may be set, with a training set of objects, to classify at least one object, remove that object from the training set and find another filter that removes at least one more object from the training set. This continues until all the members of one class have been error free classified properly. Similar processes and systems may then be implemented to distinguish each of the other classes.

When an unclassified object is introduced to the Fourier optics recognizer just described, that object is subjected to the same sequence of light, Fourier transformers, filters, inverse transformer and detector thresholds. If the first threshold is exceeded the unclassified object is classified, if the first threshold is not exceeded the next sequential process is taken. When any threshold is exceeded the unclassified objects is thereby classified. If none is exceeded then the object is one of the other classes, and the classification continues until the object is classified or left unclassified. The final classifications are accumulated for each class. This Fourier optics embodiment of the present invention can be applied to advantage to fuzzy applications.

The present invention allows the user in preferred embodiments to define margins at each decision level. In this way, when the classifier is applied to unknowns, those unknowns determined to be of a specific class will also have a confidence level associated with them. However, there may be items that will be unclassified within such margins.

An example of a preferred embodiment operation of the present invention is evident from the following problem of discriminating the 1's from the 0's as distributed in the 2D (two dimensional) space below. This combination is referred to as the XOR problem since this is the truth table for an "exclusive or" logic gate:

| 1 | 0 | | 1 | 0 | | | 0 | | 0 |
|---|---|---|---|---|---|---|---|---|---|
| 0 | 1 | | 0/ | 1 | | 0 | 1 | | 0 |

No single straight line decision surface in the left most above 1/0 pattern can separate the 1's from the 0's. The inventive solution is to do a linear discrimination in two steps. The first is a straight line decision boundary that separates the upper 1 from the other two 0's and the single lower right 1. The second step operates only on the three remaining items. In this case the lower right 1 can be separated from the two 0's by another straight line.

It is a feature and advantage of the present system that the process can be used iteratively until all the items in question are properly classified, or until some allowable unclassified amount remains. It is an advantageous feature of the present invention that if a particular discriminant is used, for example a function of weight, to classify much of the population being considered, that same parameter, weight, can be used again and again to further isolate portions of the population by using different decision boundaries in each use. Moreover, it is another feature of the present invention that a discriminant boundary decision that poorly separates objects in the population is still useful and workable if some, albeit, small portion of the population is separated and thus eliminated from further consideration. Still another feature of the present invention is that the parameters used in the inventive process need not be independent from each other. Yet another advantage is that it is possible to insert a margin between classes to allow for more robust decisions for objects not in the training sets. Still yet another advantage is that after the discriminant spaces, decision boundaries and rules are trained sequentially, they can be applied in parallel in some cases. Also, continual updating of the recognition system in light of behavior of the system on new, un-trained-on data is straightforward. A most useful property of the present invention is that this invention can be viewed as a way of making existing pattern recognition systems work better preserving the benefits of presently installed systems, but allowing for significantly improved performance. This removes many of the practical and psychological barriers of present users.

The above objects and advantages of the present invention will be better understood from the following description when taken in conjunction with the accompanying drawings.

DESCRIPTION OF THE PREFERRED EMBODIMENT

Figure 1:
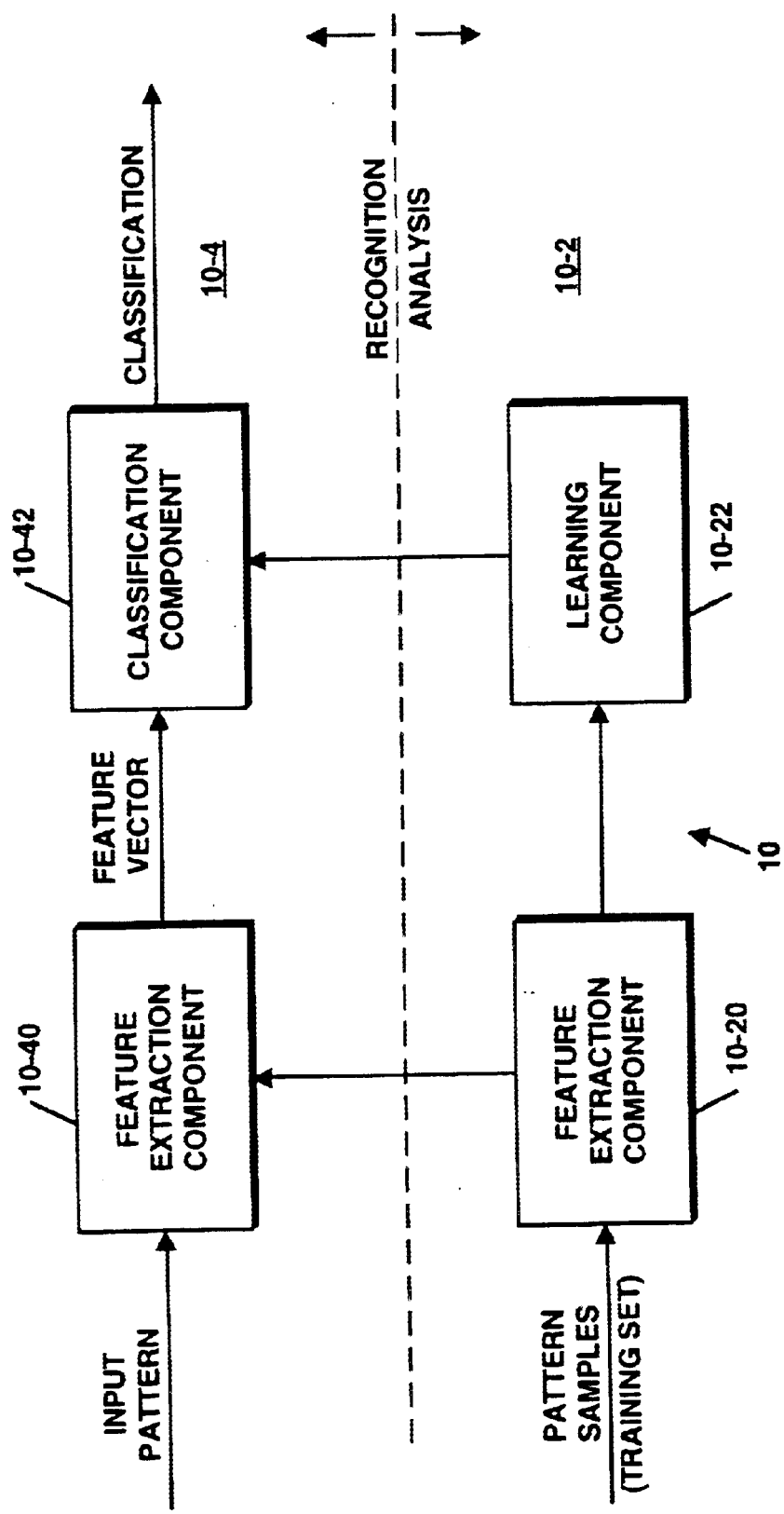
FIG. 1 is an overall block diagram of a conventional pattern recognition system.

FIG. 1 is a block diagram of a conventional pattern recognition system 10 that includes two major sections 10-2 and 10-4. Section 10-2 performs an analysis function while section 10-4 performs the recognition function. As shown, section 10-2 includes a feature selection component 10-20 and a learning component 10-22. Section 10-4 includes a feature extraction component 1040 and a classification component 10-42.

Feature Extraction and Section Components

As known in the art, what features are extracted and how this is accomplished depend on the patterns and the number of classes under scrutiny. Generally, extraction and selection methods follow one of two types of schemes. A first scheme is feature space transformation process wherein the system components transform original feature space into lower dimensional spaces for pattern representation and/or class discrimination. In the case of pattern representation, systems often use least-mean-square error and entropy criteria in determining the best transformation. To discriminate among classes, systems often maximize distances within classes or use combinations of the above techniques as an optimization criterion. Some systems use both linear and nonlinear transformations. The second scheme is information and distance measures wherein the recognition system attempts to select a subset of l features from a given set of N features (l<N) without significantly degrading the performance of the recognition system. That is, the system does not significantly increase the probability of misrecognition or more generally, the risk associated with decision making. Generally, this is accomplished by selecting a feature subset to maximize a pre-specified information or distance measure. In the case of the present invention, the system is able to select the appropriate scheme for use by the feature extraction and feature selection components 10-20 and 10-40.

Classification and Learning Components

Classification can be interpreted as a partition of feature space into mutually exclusive regions such that each region is associated with one class. The results of discriminant analysis and statistical decision theory can be used for classification. When the conditional probability density functions of the feature vectors for each class, called class density functions, are known or can be accurately estimated, the system can use the Bayes classification rule that minimizes the average risk or the probability of misrecognition. When the class density functions are unknown, the system uses a non-parametric classification scheme. The system can also use k nearest neighbor classification rules as convenient classification schemes. Also, in some applications, the system may find it advantageous to use decision tree schemes.

Figure 3:
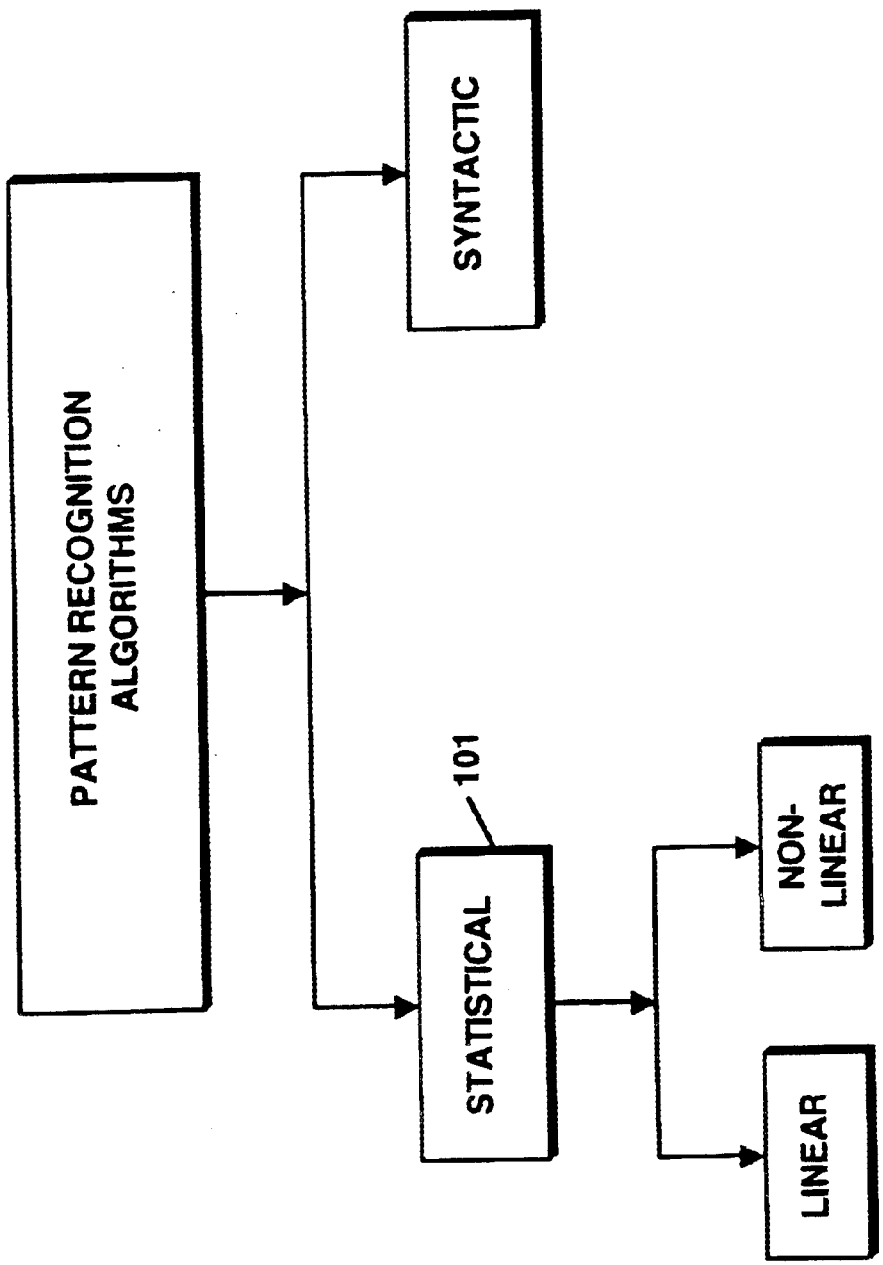
FIG. 3 is a drawing illustrating the classification of pattern recognition algorithms.

FIG. 3 graphically illustrates various types of pattern recognition algorithms that may be used as a function of the type of application being carried out. In the case of the present invention, as discussed herein, the system can select from the different types of algorithms of FIG. 3 as a function of the particular application being performed.

The learning component 10-22 is designed to be trained by applying pre-selected pattern samples that define a training set whose correct classification is known as is the practice in the prior art. The learning component 10-22 stores sets of features determined to be required for correct identification in memory. However, according to the teachings of the present invention, learning component 10-22 may be adapted to utilize the procedures of the present invention as discussed herein. For further information regarding the above prior art components, reference may be made to the article entitled "Pattern Recognition and Computer Vision" by K. S. Fu and Azriel Rosenfeld published in the October 1984 issue of the IEEE publication-Computer.

Figure 2:
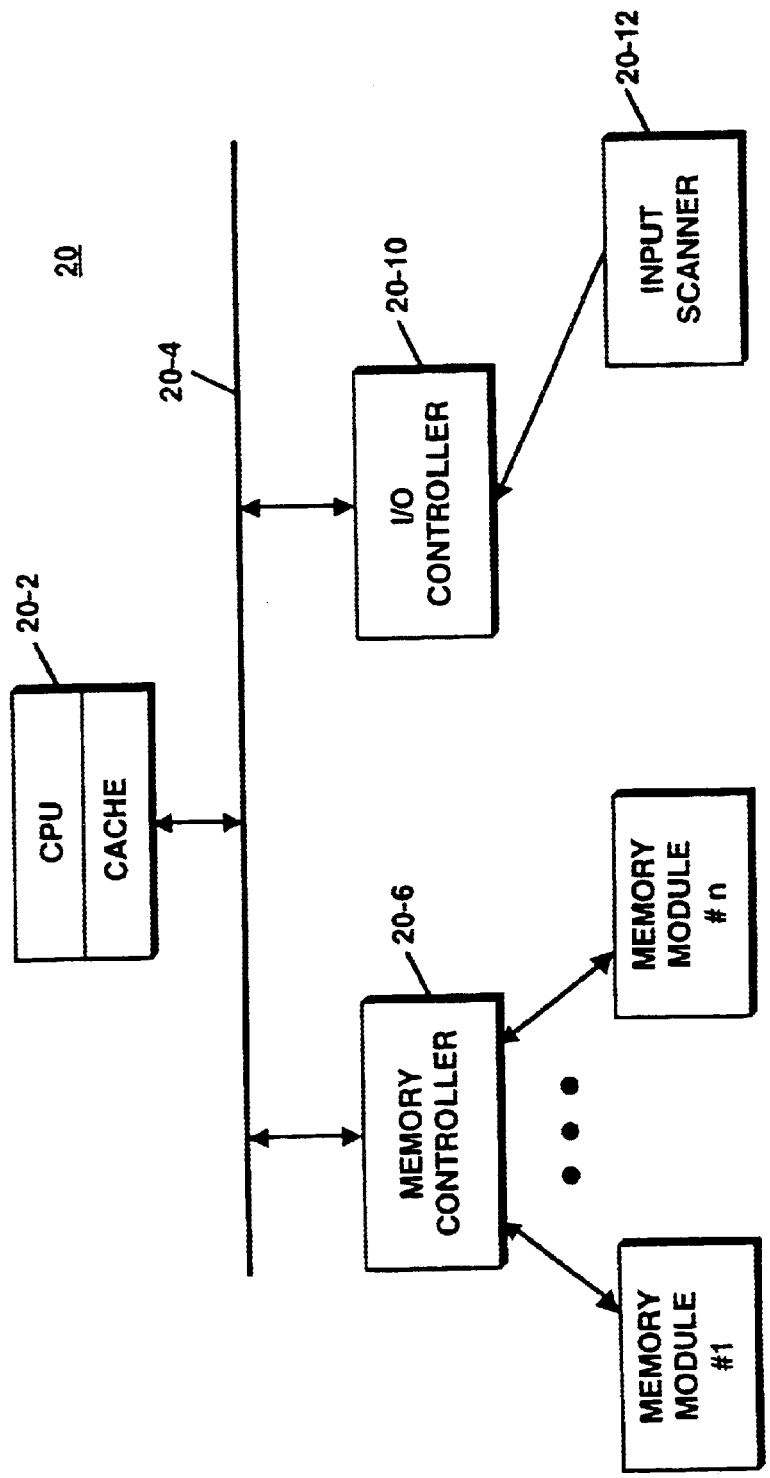
FIG. 2 illustrates a computer system that uses the training procedure of the present invention.

FIG. 2 illustrates a system 20 that can be used to carry out the method of the present invention. For the most part, the system 20 is constructed from standard computer components as shown in the figure. System 20 includes a standard microprocessor and cache component 20-2 that operatively couples to a standard bus 20-4. The bus 20-4 in turn connects to memory storage components (i.e. memory controller 20-6 and memory modules 1 through n) and to standard input/output components such as I/O controller 20-10 and input scanner 20-12. The scanner 20-12 performs any required preprocessing of the input image (e.g. digitizing the input patterns, enhancing pattern contrast). The input data patterns to be processed for a given application are scanned into the system's memory wherein it is operated upon by patter recognition software previously loaded into the system in a conventional manner. As described herein, this pattern recognition software includes the components of FIG. 1 and is configured to perform the procedures of the present invention described in FIGS. 4a to 4d as discussed herein.

Description of Operation

With reference to FIGS. 1 through 7b, the procedure of the present invention will now be described. Referring to FIG. 3, there is illustrated the operations performed during a training phase by the pattern recognition system made in accordance with the present invention. It is assumed that the system of FIG. 2 has been appropriately configured for running the particular application (e.g. receiving the patterns representative of the data used by the application such as bio-metric identification or semiconductor chip patterns).

Figure 4A:
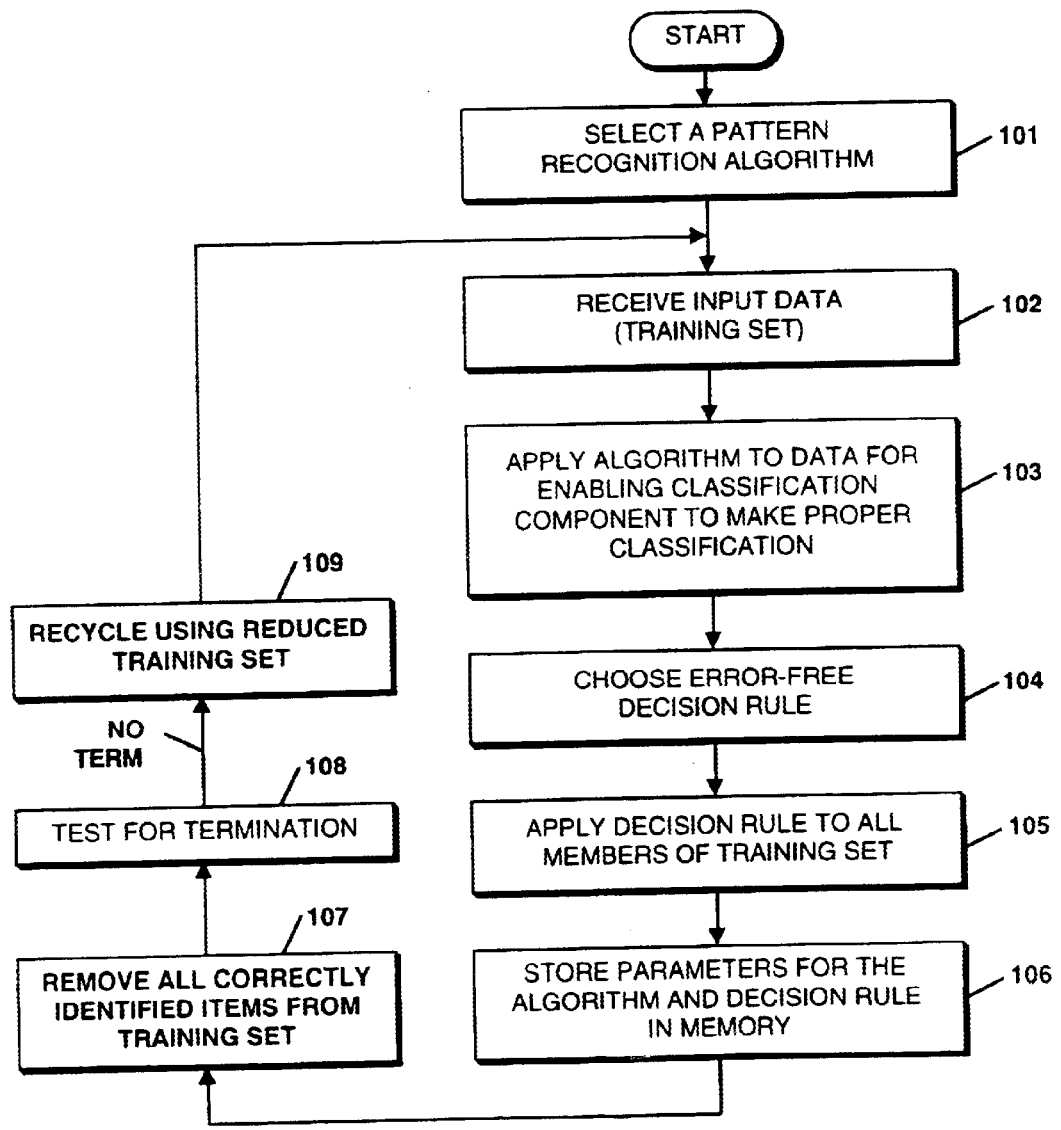
FIGS. 4a, 4b, 4c, 4d, and 4e are flow diagrams that are used to describe the procedure of the present invention.

Referring to FIG. 4a, it is seen that the system first selects a pattern recognition algorithm from a previously stored set of algorithms that includes the type of algorithms illustrated in FIG. 3 as indicated in block 101. Next, the system inputs data via an I/O device controller from an input scanner 20-12 of FIG. 2.

In the present example, initially, input data in the form of a training set that corresponds to a collection of representative data inputs whose proper classification is known is applied to the recognition system components of FIG. 1. As indicated in block 103 of FIG. 4a, this training set is applied to the learning component 10-2 which operates to store in memory, sets of features that have been previously determined to be required for correct identification of the patterns to be processed by the system. The resulting output is applied as an input to the classification component 10-42 of FIG. 1.

Using the selected algorithm (i.e. the particular method and input parameters), the system components transform the input data patterns into numbers, positions in abstract space or the like that are stored in feature space. Next, as indicated in block 104 of FIG. 4a, the classification component 1042 of FIG. 1 selects an error-free decision rule specific to the particular application. As indicated, the decision rule is a method for converting the numbers, positions, etc. obtained in block 103 into class decisions.

Figure 5:
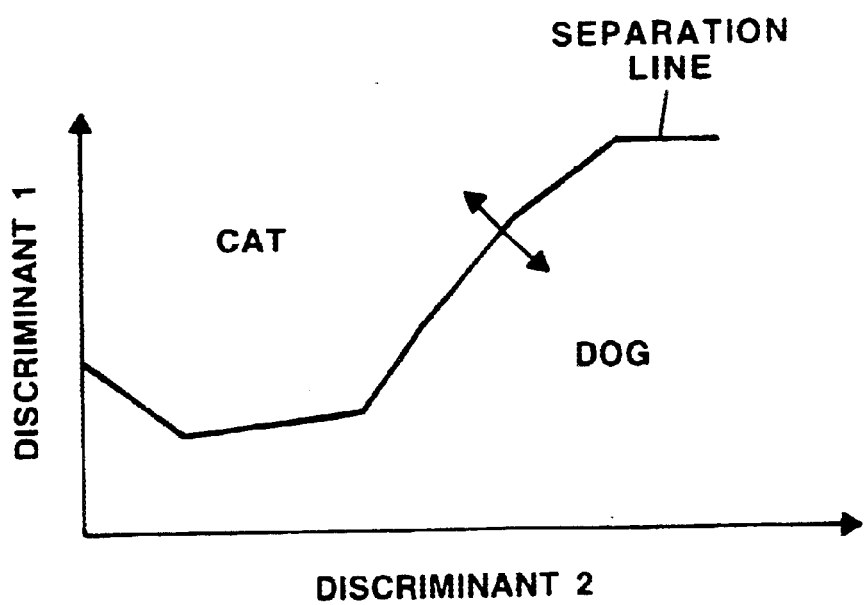
FIGS. 5, 6, 7a and 7b are examples used in illustrating the operation of the training procedure of the present invention.

It will be assumed by way of example and not as a limitation of the present invention, that a simple decision rule is selected such as the rule illustrated in FIG. 5. In this case, using standard linear discriminators, the classification component 1042 will be able to correctly classify data patterns as falling within in one of two classes, CAT and DOG. Next, as indicated in block 105, the classification component applies the selected decision rule to the input data patterns that are representative of different types of animals including dogs and cats.

As long as the two classes of data items can be defined by the single separation line shown in FIG. 5, classification will be made perfectly or error-free. That is, data items that spatially fall to the left of the line are defined as and will be placed in the CAT class and data items that fall to the right of the line will be place in the DOG class.

It is well known to those skilled in the art that in some cases, the classification component will also classify some data items incorrectly. For example, consider the distribution of sets of data items represented as "1s" and "0's" is FIG. 6. As seen from FIG. 6, there is no simple separation line that identifies all of the data items correctly. It is seen that the first line labeled rule 1 in FIG. 6 only identifies one datum correctly. But, the inclusion of the second separation line labeled rule 2 allows the correct identification of all data items in FIG. 6. The present invention embodies this concept.

In accordance with the present invention, as indicated in block 106 of FIG. 3a, the system stores parameters, thresholds, data structures and other such information and variables in a computer from which these parameters, etc. can be retrieved by the operating software for use during classification.

Next, as indicated in block 107, the system processor removes all of the correctly identified items from the original training set that were correctly identified by the application of an error free decision rule to the training set. For example, in FIG. 6, after removing the "1" on the left of the Rule 1 line leaving the "0,0,1" pattern to the right of the rule 1 line of FIG. 6 to be further classified. Next, the system tests for termination. Termination is defined in terms the system detecting having reached one of two states. The first state is reached when the classification component correctly identifies all of the members of the training set. The second state is reached when it is determined that the data items can not be separated-they are indistinguishable.

In the present example, termination is not reached since neither state has been reached. Next, as indicated in block 109, the system recycles or reiterates the operations of blocks 102 through 107 using a new reduced training set. The new training set corresponds to the data items of the original training set minus all of the data items that have been correctly identified by classification component 10-42 of FIG. 1. The recycling operation results in the generation of a second decision line that is labeled rule 2 in FIG. 6 and a new decision rule (i.e. data items located in the region South East of the line has the value 1). Again, the parameters and data structures representing this separation line and new decision rule are stored in memory by the learning component 10-22. These additional correctly identified items resulting from the recycling operation are removed from the reduced training set and the system further tests for termination.

Figure 6:
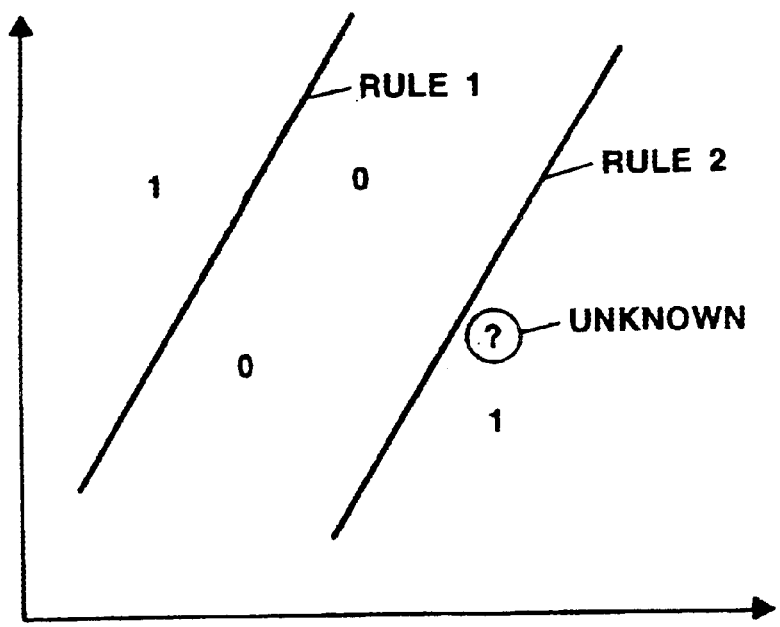

When the system performs the test for termination, it can be seen from FIG. 6 that all of the data items have been correctly identified which results in the termination of the training phase. The system having been completely trained is now ready to enter the recognition phase wherein the previously defined decision rules are applied to unknown input data patters of the same form as the previous input data. By such training, the unknown patterns supported by the training set will be correctly identified.

Figure 4B:
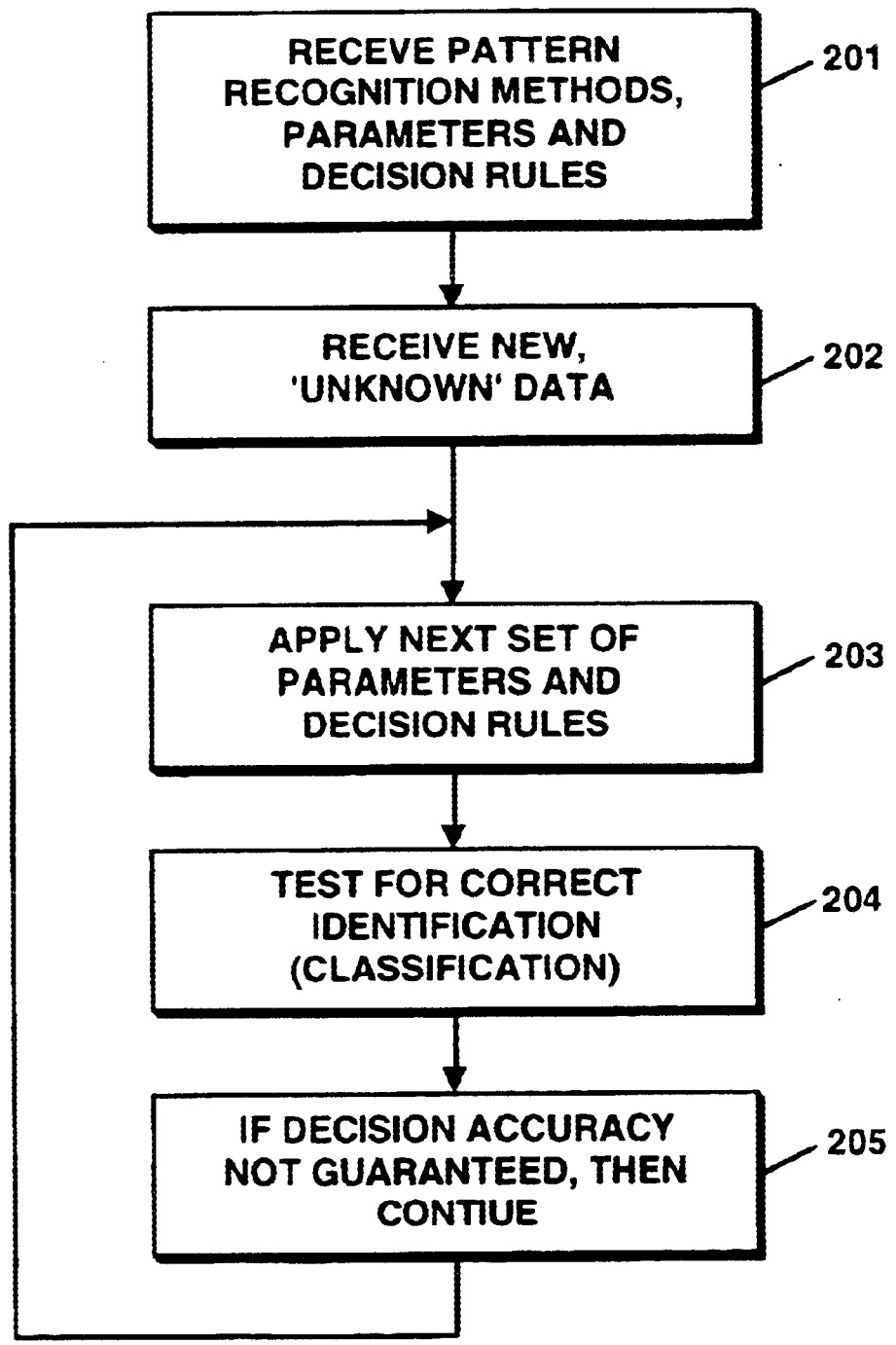

The inventive system processes these input patterns as set forth in FIG. 4b. First, as indicated in block 201, the results of the operations of blocks 101 and 106 of the training procedure of FIG. 4a are used to configure the pattern recognition system classification component. When so configured, the classification component is able to carry out the identification of data items in an error free manner.

In greater detail, as indicated in block 202 of FIG. 2, the system is enabled for receiving new unknown data applied via scanner 20-12. It is assumed by way of example that the unknown data item falls in the region labeled with a question mark (?) in FIG. 6. Next, the system's classification component operates to apply the first set of parameters and decision rule (i.e. those associated with the line labeled rule 1 in FIG. 6). As indicated in block 204 of FIG. 4b, the system next tests for the correct result and then sequences to block 205. Since the data item resides outside the region defined by separation line labeled rule 1, the system recycles back to block 203. Next, the system applies the second set of parameters and decision rule (i.e. those associated with the line labeled rule 2 in FIG. 6). The application of this rule by the classification component indicates that the unknown has a value 1. Thus, through the training procedure of the present invention, the system is able to correctly identify all unknown patterns supported by the training set. FIG. 4e shows a logic block diagram of this iterative process.

Figure 4C:
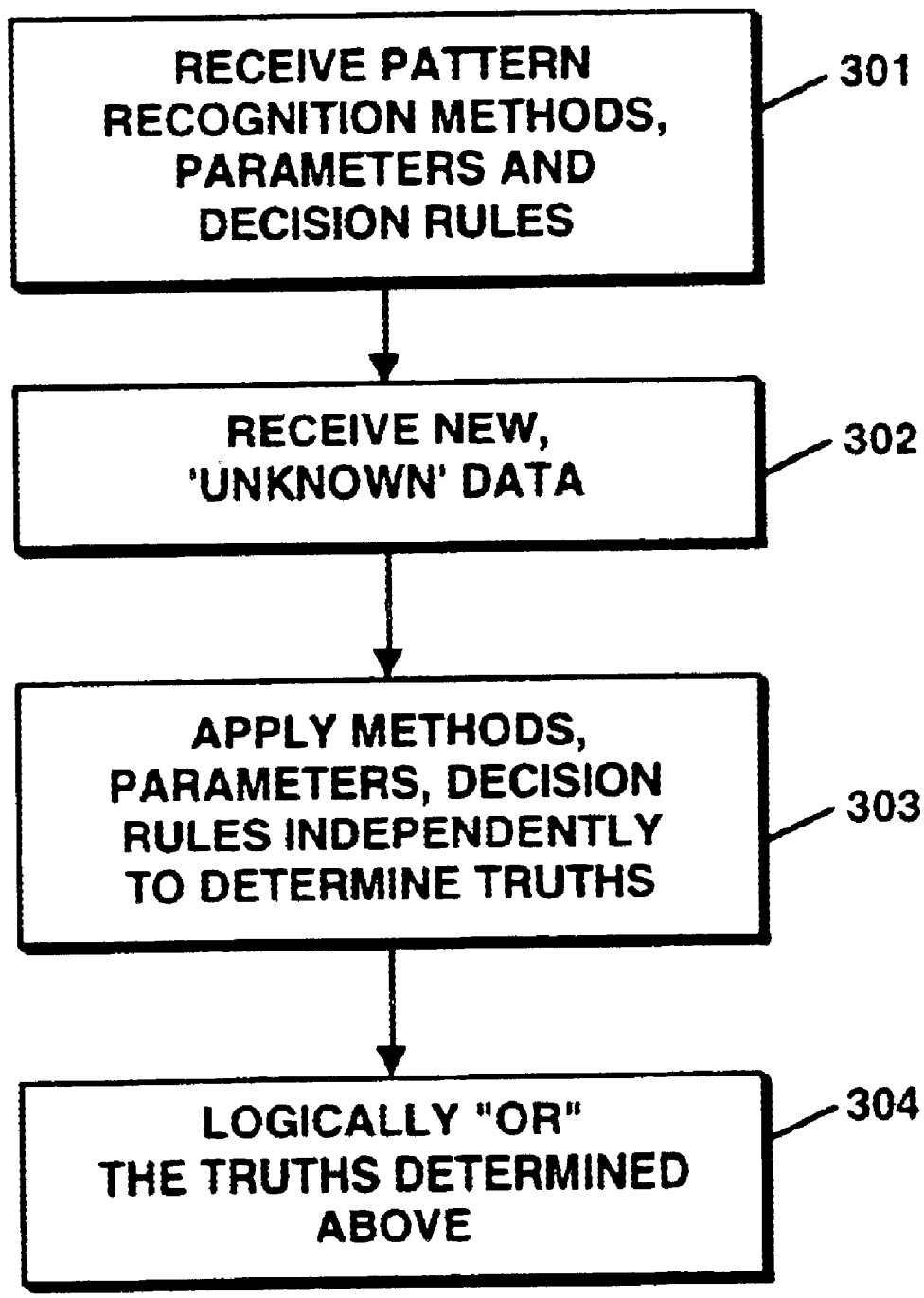

FIG. 4c is a flow chart that illustrates a modification of the recognition process of the present invention that improves the performance of the process through independent decision making elements. This parallel independent operation is applicable only when the descriminant decision boundaries are of the same type. For example if the decisions are separating objects of the same class from population of objects this parallel operation applies. FIG. 4e show more detailed examples of blocks 303 and 304 of FIG. 4c. It is seen that the system in performing the operations of blocks 301 and 302 in the same manner as blocks 201 and 202 of FIG. 4b. Next, in contrast to the procedure of FIG. 4b, the system includes a plurality of classification components that enable the independent application of the sets of parameters and decision rules obtained during the training phase. These operations are indicated in block 303.

FIGS. 4e illustrates applying the inventive process in parallel where all the unclassifed objects are presented to the inventive system at the same time and the results presented at one time. The discriminant are of the same type in each of the parallel operations 212 and 214. Here the objects classified as A's from each discriminant and threshold operation are directly "ored" and accumulated since there is no overlap in the distributions of the objects in the discriminant space.

Figure 4D:
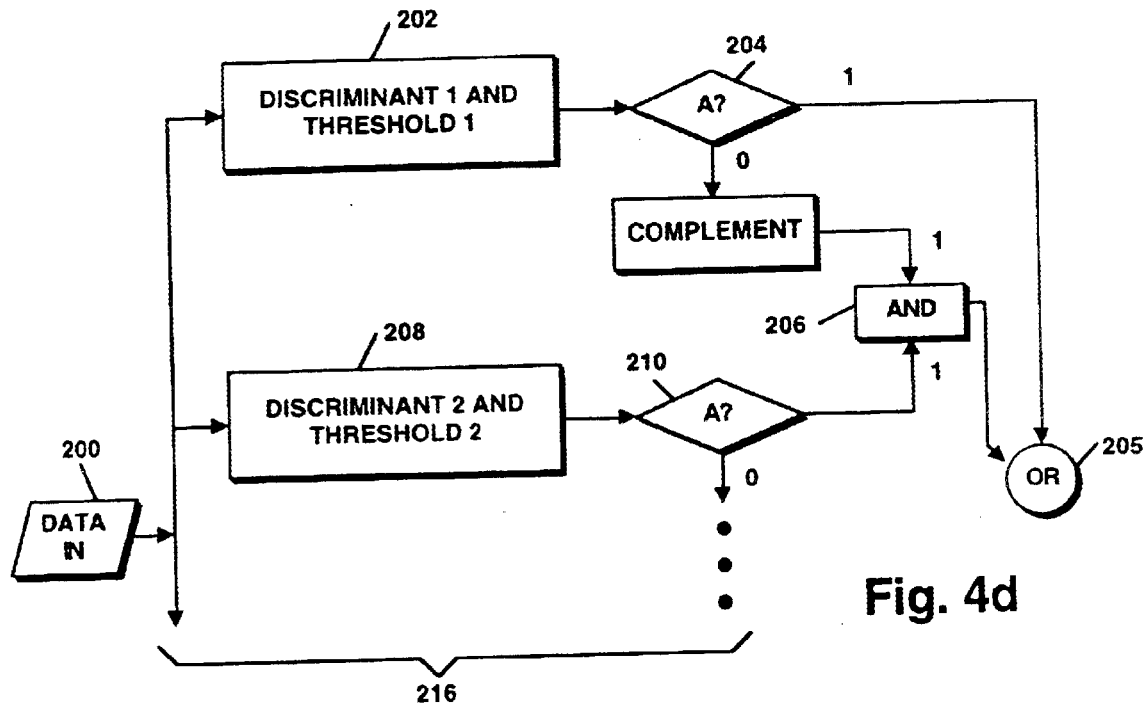
Figure 4E:
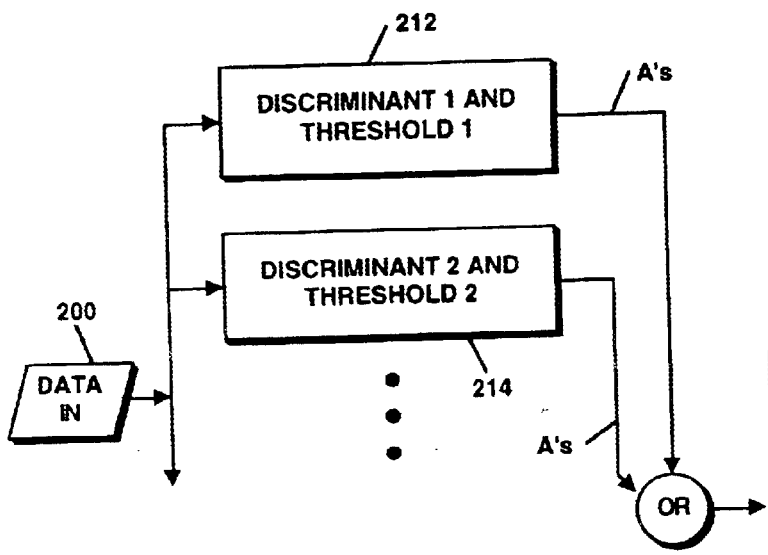

However, as illustrated in FIG. 4d, the general case there will be different types of discriminants used and in this case the distributions of the objects will usually ovelap in different ways. Here the objects that are not classified by the first discriminant space and threshold 202 must be allowed, by the "and" gate 206, to be classified as A's during the next sequential operation using a second discriminant and threshold 208. Again the results are logically sequentially accumulated by "oring" to provide the classification of the A's.

It is understood that the above techniques can be applied and extended to classify objects of many classes.

Still referring to FIGS. 4d and 4e, these same logic diagrams can be used to describe the present invention as applied to fuzzy applications. In this case the logic gates take on different meanings. The AND gate becomes a MIN (minimum) determination; the OR becomes a MAX (maximum), and the COMPLEMENT or "not" gate becomes a SUB (subtraction) operation. In each case the determination indicates a w strength of the classification, not an absolute as in the above discrete (I/O) examples.

Figure 7A:
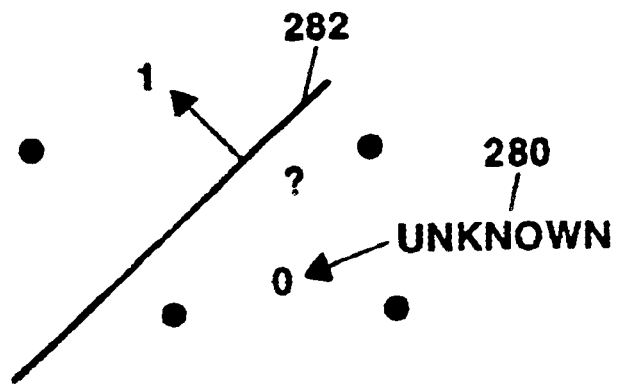
Figure 7B:
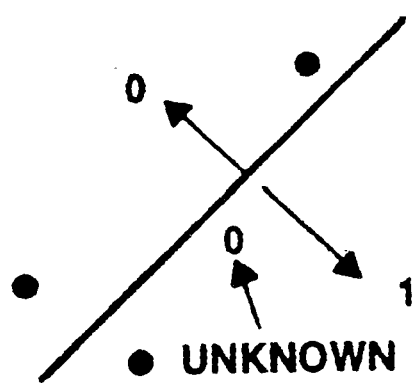

In another example, the results of two tests are graphically illustrated in FIGS. 7a and 7b, wherein an unknown 280 is to be classified. The first test (t1) yields the following result:

t1(1)=truth of the hypothesis 1. Hypothesis 1 states that any object to the left of the line 282 meets that test. By inspection the unknown is to the right of the line and a result of test 1=0. The second test (t2), shown in FIG. 7b, yields the following result:

t2(1)=truth of the hypothesis 1 as a result of test 2=1.

The truths determined from applying the decision rules as shown in FIG. 4c which rules may be applied in parallel and the outputs are then logically "Ored". This results in the following: t1(1) OR t2(1), which becomes 0OR 1=1.

Still referring to FIG. 4c, the system processor of this invention establishes that t(1)=truth of hypothesis I=1. The unknown data item has a value of 1. Block 303 compares those values with the reference or threshold values and from that comparison determines whether or not the hypothesis is true (t=1) or false (t=0).

Figure 8A:
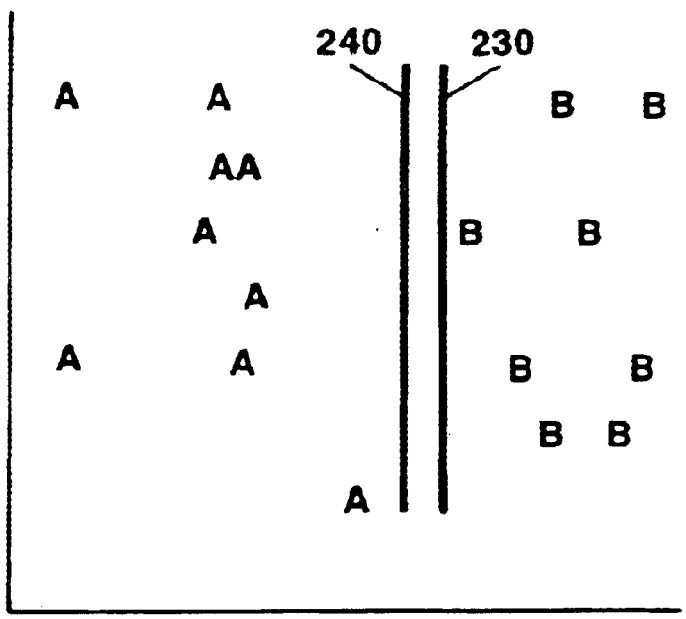
FIGS. 8a and 8b are illustrations showing use of margins in the present invention.
Figure 8B:
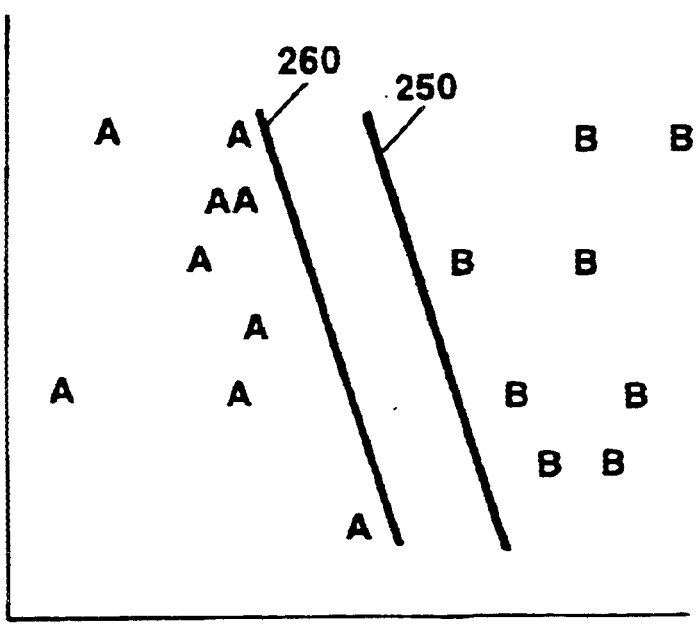
Figure 9B:
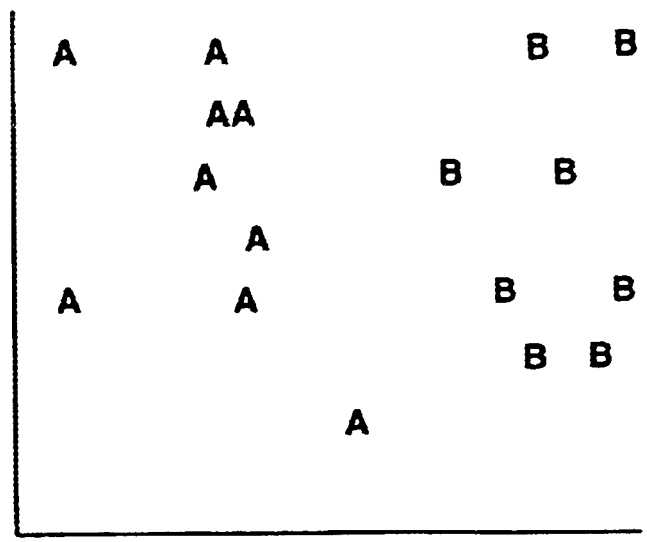
FIGS. 9a and 9b shows a linear separable and a non-linearly separable distribution of objects.
Figure 9A:
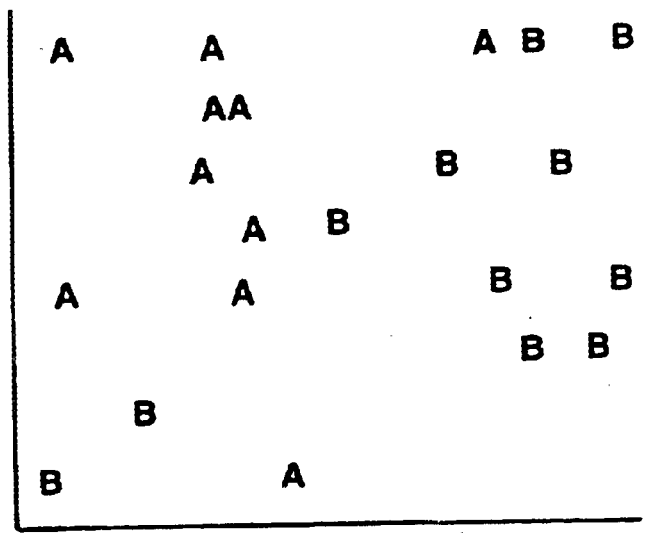

In practice, it is important that the recognition system be robust. As mentioned above use of margins imparts more robustness as shown in FIGS. 8a and 8b and 9a and 9b. In FIG. 8a the vertical line decision boundary separates the classes and there is a small separation available that can be used to impart this robustness. For example every unknown to the right of the 230 line is classified as a B object and those to the left of the line 240 an A object. An A object that appears to the right of line 230 will be mis-classified, and the difference between that particular A object and a properly classified A object is the distance between the two decision lines. However, referring the FIG. 8b, the distance between the 250 and the 260 lines is much larger and therefore provides a more robust discrimination. In practical operations the use of such margins may result in some objects falling between the lines and thus not classified. The two classes A and B are linearly separable, but the choice of the discriminant space may be crucial. In FIG. 9a the horizontal and vertical axes doe not separate the A's and B's wherein FIG. 9b they are well separated.

From the above, it is seen how the training procedure of the present invention can be used to improve the accuracy of standard pattern recognition systems. The present invention accomplishes this without having to make false positive or false negative errors among the members of the training set. Thus, the invention allows prediction and achievement of minimum error among untrained/unknown inputs supportable by the training set. The invention makes it easier and faster to train systems. Also, the inclusion of the teachings of the present invention can be made with little modification and retraining of a particular recognition system.

In particular, when a system makes some errors, the user might retrain the system with an expanded training set that included the erroneously classified samples. This entails reestablishing all the working parameters and operators with the expanded training set, and can be expensive in time, people and money. In this preferred embodiment, the inventive system can be applied using the previously learned pattern recognition operators but with re-adjusted decision thresholds or boundaries and rules that will classify most members of the expanded training set, leaving a small residual set that are unclassified. That residual set is then taken as a new training set and by applying the present inventive techniques classify them correctly. In this instance, the present invention is directed to a post recognition by the existing system techniques using the reduced set as taught by this invention.

A second approach to using is to take the samples misclassified by the existing system and take them as inputs to the present inventive system and learn to classify them properly. This post activity uses the entire existing system and post-processes the questionable samples into correctly classified objects.

Figure 10:
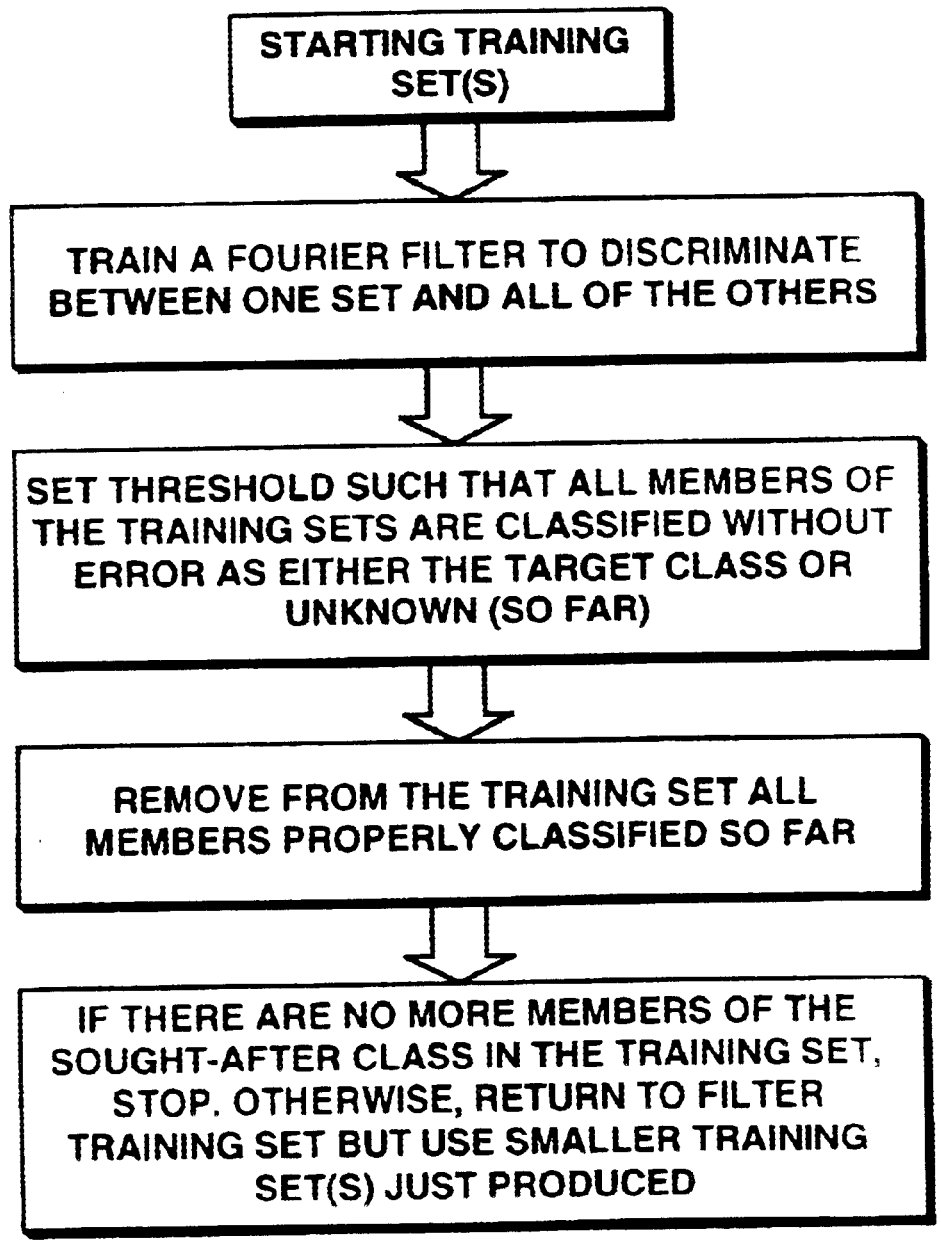
FIGS. 10, 11 and 12 illustrate embodiment of the present invention using Fourier filters and as applicable to the distribution in FIG. 10.
Figure 11:
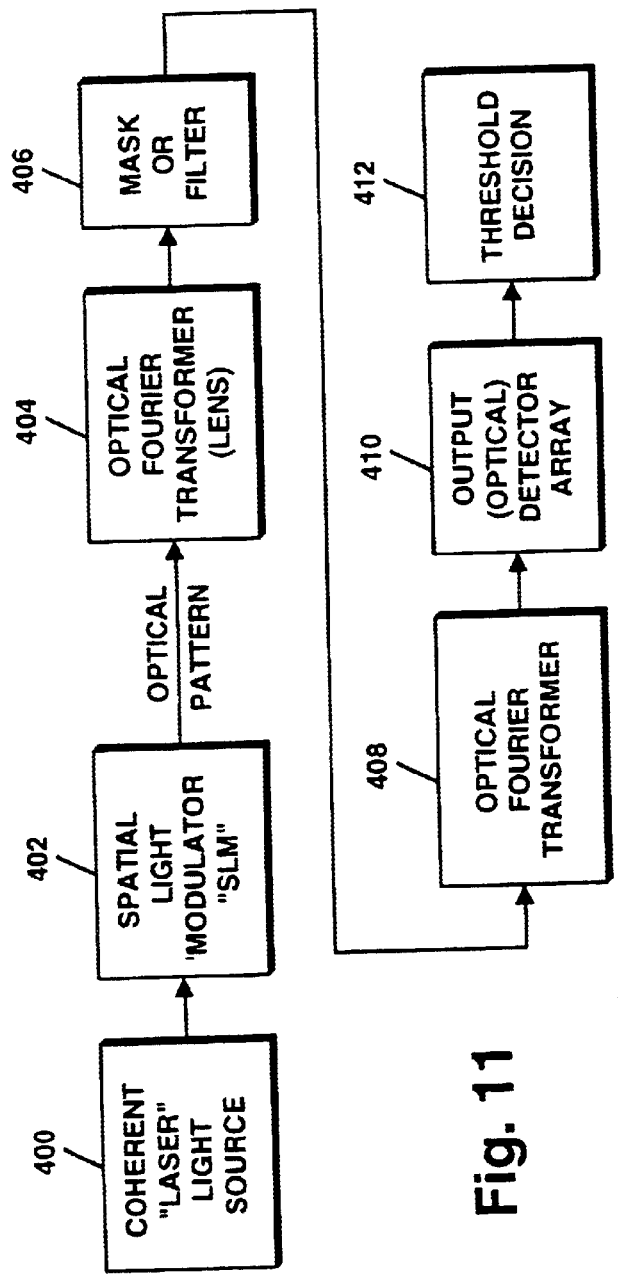

Referring to FIGS. 9, 10 and 11 a pattern recognition system using Fourier filtering techniques that are well known in the field is briefly described herein. More complete information is found in many commonly available texts. It is well known that an input amplitude pattern $f(x,y)$ is transformed by an optical lens into a spatial amplitude display of its Fourier transform $F(u,v)$. A recognition mask $M(u,v)$ may be inserted in the u-v plane, so the amplitude of light leaving the u,v plane is $F(u,v)M(u,v)$. That, in turn, is transformed again by another lens to form an output amplitude pattern $O(x,y)$. It is convenient to substitute $$\xi=-x$$
$$\eta=-y.$$

Then $O(\xi,\eta)$ is the inverse Fourier transform of FM, so $$O(\xi,\eta)=f(\xi,\eta))**m(\xi,\eta),$$

where m is the function whose Fourier transform is M and ** indicates a two dimensional convolution.

It is clear that the output pattern is an integral (differently phased at every output point) of $F(u,v)M(u,v)$. That is, it is a weighted sum or integral of the inputs $F(u,v)$. Thus, O is a linear discriminant that is a linear function of the inputs producing a single output number $O(-x,-y)$ for each input point $f(x,y)$. O is a projection of $F(u,v)$ onto a straight line in u-v space. Accordingly a good line (a good filter) and a threshold on that discriminant parameter can be selected such that a class of objects tend to lie on one side of the threshold and all other objects lie on the other side. If the training set allows such a line to be drawn, that set is said to be linearly separable. Usually in practical applications, there are many components—perhaps $10^5$ or more—in $F(u,v)$.

FIG. 10 shows a plot of A's and B's that are not linearly discriminable. A straight line cannot separate the A's from the B's.

In this preferred embodiment, a formal definition of the discriminator is the 4-tuple $$D=\{\Phi,T,\Omega,X\},$$

Where $\Phi$=the ordered set of N discriminants $\phi_1, \phi_2, \ldots \phi_N$

T=the ordered set of corresponding thresholds $T_1, T_2, \ldots, T_N$ $\Omega$=the ordered set of widths of the guard bands $w_1, w_2, \ldots, W_N$ about the thresholds X=the nonlinear combination method used.

Referring to FIG. 10, a flow chart: of the following steps:

1. Pre-training: During this phase, divide the training set into two classes—A (to be recognized) and B (the balance of the available information—noise, interferants, other classes of objects)
2. Begin Iteration: During this phase, train a discriminant $\Phi$ to separate A from B, or at least some A objects from the group.
3. Select T and w for that discriminant:
4. Evaluate all members of A and B using that $\Phi$, t, and w:
5. Remove from A all members properly classified so far (the threshold and widths set so that no member of B is declared an A): This step results in a new A of reduced cardinality.
6. If the new A is empty, stop.
7. Otherwise return to step 2.

Step 5 can be modified readily by defining the margin of acceptable discrimination as being above zero.

After the recognition system using Foruier filters has been trained it may be applied to unknown objects. When applied to unknowns, the unknowns may be operated upon in sequence by a first Fourier filter and corresponding threshold where some unknowns are classified. The remainder of the unknowns then are subject to the next Fourier filter, etc. until all the unknowns are classified.

FIG. 11 shows a block diagram of a known optical Fourier transform system. A coherent light source 400 is spatially modulated (SLM) and incident on an optical lens structure 404. The SLM might be a transparency or a device that writes a spatial pattern onto a laser beam. The output of 404 is a Fourier transform f(u,v) of the pattern. A mask or filter, characterised by the function M(u,v), 406 converts the Fourier transform F(u,v) into a pattern F(u,v)M(u,v). The function 408 transforms the signal back into a convolution in t e x, y or location domain of f(x,y) convolved with a pattern m(x,y). That x,y pattern is presented to a optical detector array. With a given threshold 412 set into the optical detectors all signals above a threshold indicates the presence and locations of the images of inputs that belong to a given class.

The profound advantage of the Fourier pattern recognition is that it identifies and locates the items of interest. In this known prior art, however, only linearly separable problems are amenable to such pattern recognition.

The present invention adds the following to the above description and thereby makes the Fourier filter pattern recognition applicable to a wide variety of practical problems. In the above process, the present invention provides for a given mask and a programmable or setable threshold as applied to a training set of known objects. In operation according to the present invention the threshold is lowered until an item is misclassified. The threshold is then raised heuristically until only one class of objects is detected.

Those objects so classified are then removed from the training set and the reduced training set is used to find a second mask and a second threshold as described above. This process continues until all the objects in one class are properly classified. The system can then be implemented to find all the objects in another class, and so on. When an unclassified objects is imaged by this recognition system it is operated on by the first mask and threshold and if the objects produces a signal above the threshold associated with that first mask, it is classified. If not then the process continues with the second and subsequent masks and thresholds until the object is classified.

Figure 12:
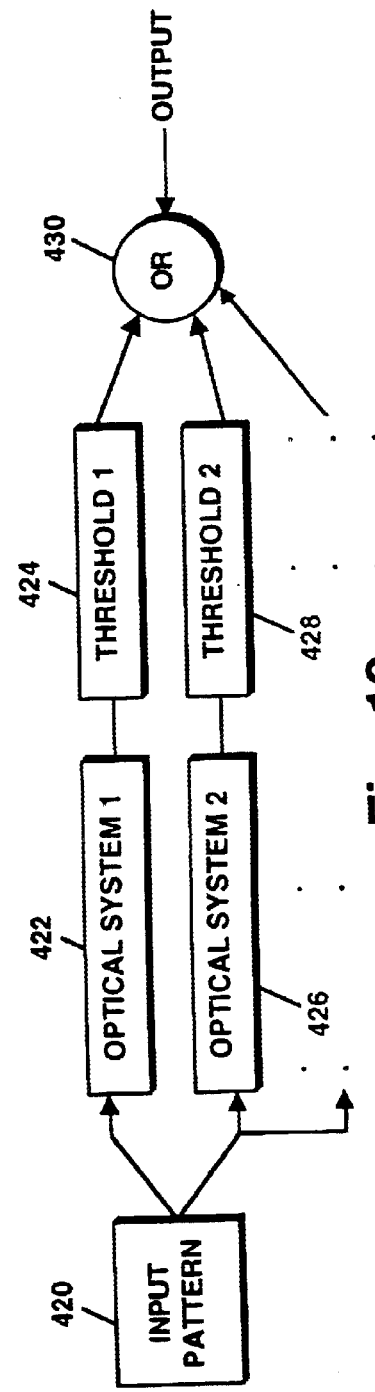

FIG. 12 shows a block diagram where the above sequentially operated system is operable in parallel to simultaneously provide the proper classifications. Here the input pattern 420 is operated by the optical Fourier transforms and mask 422 and threshold 424 and in parallel with the optical Fourier transform and mask 426 and threshold 428. Since each path separates objects of the same class from the remainder of the objects, logically "oring" the outputs of each of the paths will provide all the objects recognised in that class. It is obvious by inspection that objects classified two or more times are acceptable, and objects that pass one threshold but doe not any other threshold are also acceptable.

In another preferred embodiment, the signals incident on the optical detectors may be normalized to make the thresholds all equal to one.

In yet another embodiment, the Fourier system described above may be applied to fuzzify the system and the determinations from the system. If signals have been normalized by dividing by the individual thresholds such that the relative brightness of each pixel is comparable to the brightness of all the pixels as illuminated by all the optical outputs, then the brightness of any one pixel is a measure of the likelihood of that pixel being of one class compared to another class. If there were only two classes, say A and B, as discussed above, then the brighter pixels would be a measure of the likelihood of each pixel being in class A and not in class B.

Although the invention has been described with reference to particular emobodiments, it will be understood that this invention is also capable of further and other embodiments within the spirit and scope of the appended claims. For example, this invention has been described in terms of relatively straightforward systems, however, the teachings provided herein are also applicable to any type of pattern recognition system.

What is claimed is:

1. A process for training a pattern recognition system as comprising the steps of:
    (a) providing a training set of objects each classified in two or more classes;
    (b) taking data from each of the objects;
    (c) selecting a first discriminant space and computing discriminant values from the data;
    (d) plotting the values in the discriminant space;
    (e) establishing a decision boundary associated with the discriminant space;
    (f) setting the decision boundary and applying a decision rule wherein at least one object in the training set is separated and correctly classified;
    (g) removing correctly classified objects from the training set, thereby creating a remaining set of objects;
    (h) storing the first discriminant space, corresponding decision boundary and decision rule;

(i) selecting a number of objects in the remaining set of objects such that when that number or zero is reached the pattern recognition system is trained;

(j) repeating steps (a–g) with the remaining set of objects until the selected number or zero is reached:

(k) introducing a set of objects, the objects known to be members of the two or more classes but unclassified as to which class, to the trained pattern recognition system;

(l) taking data from the unclassified objects;

(m) retrieving the first stored discriminant space, decision boundary and decision rule;

(n) computing discriminant values from the data and plotting the values in the discriminant space;

(o) applying the decision boundary and decision rule to the plotted values;

(p) removing classified objects from the unclassified set;

(q) sequentially retrieving the next discriminant space, decision boundary and decision rule; and (r) applying the next discriminant space, decision boundary and decision rule to the diminishing unclassified set of objects.

2. The process as defined in claim 1, further comprising the step of repeating the process as defined in claim 1 until the unclassified objects or the stored discriminant space, boundaries and decision rules are exhausted.

3. Process of classifying unclassified objects using a pattern recognizer as trained and defined in claim 1, comprising the steps of:

introducing unclassified objects to the trained pattern recognition system;

taking data from the unclassified objects;

retrieving the all of the stored discriminant spaces, decision boundaries and decision rules;

computing discriminant values from data and plotting discriminant values in the discriminant spaces;

applying corresponding decision boundaries and decision rules to all the plotted data in parallel, wherein each decision rule classifies objects of a particular class; and combining objects in the same class.

4. The process as defined in claim 3, wherein the step of combining groups of all objects of at least one class.

5. The process as defined in claim 3, wherein each step of applying classifies a portion of one class from the unclassified objects.

6. A process of improving the performance of an existing pattern recognition system, wherein the existing system has defined discriminants comprising the steps of:

accumulating objects misclassified or unclassified by the existing system; and using these misclassified objects as a training set, and applying the process as defined in claim 1 to said training set defined herein.

7. A process for training a pattern recognition system, comprising the steps of:

(a) providing a training set of objects each classified in two or more classes:

(b) taking data from each of the objects;

(c) selecting a first discriminant space and computing discriminant values from the data;

(d) plotting the values in the discriminant space;

(e) establishing a decision boundary associated with the discriminant space:

(f) setting the decision boundary and applying a decision rule wherein at least one object in the training set is separated and correctly classified;

(g) removing correctly classified objects from the training set, thereby creating a remaining set of objects:

(h) storing the first discriminant space, corresponding decision boundary and decision rule;

(i) selecting a number of objects in the remaining set of objects such that when that number or zero is reached the pattern recognition system is trained; and (j) repeating steps (a) through (g) with the remaining set of objects until the number of objects remaining in the training set is the select number or zero, (k) introducing unclassified objects to the trained pattern recognition system:

(l) taking data from the unclassified objects:

(m) retrieving the all of the stored discriminant spaces, decision boundaries and decision rules:

(n) computing discriminant values from the data and plotting discriminant values in the discriminant spaces:

(o) applying corresponding decision boundaries and decision rules to all the plotted data in parallel, wherein each decision rule classifies objects of a particular class; and (p) combining objects in the same class into logical output groupings comprising fuzzy determinations of the likelihood of the object being within a class.

8. A process for training a Fourier filter pattern recognition system with a training set of patterns positioned in an x,y plane known to be in two or more classes, comprising the steps of:

(a) modulating a coherent light beam by each of the patterns;

(b) optical Fourier transforming the modulated coherent light beam;

(c) masking or filtering the Fourier transformed beam thereby providing a masked output;

(d) optical Fourier inverse transforming of the masked output, thereby forming an optical signal positioned in a plane that corresponds to the corresponding positions in the x,y plane;

(e) sensing the optical output of step (d);

(f) applying a threshold to the sensed optical outputs;

(g) determining the x,y positions of the sensed optical signals that exceed the threshold, and classifying those patterns located at the corresponding x,y positions;

(h) removing those classified patterns from the remainder of the training set, thereby creating a remaining set of patterns;

(i) storing the masks and the thresholds;

(j) selecting a number of patterns in the remaining set of patterns such that when that number or zero is reached the Fourier filter pattern recognition system is trained;

(k) repeating steps (a) through (i) with the remaining set of patterns until the selected number or zero is reached;

(l) introducing an unclassified set of patterns the patterns positioned in an x,y plane and known to be in two or more classes but unclassified as to which class, to the trained Fourier filter pattern recognition system;

(m) modulating a coherent light beam by each of the unclassified patterns;

(n) optical Fourier transforming the modulated coherent light beam;

(o) masking or filtering the Fourier transformed beam thereby providing a masked output;

(p) optical Fourier inverse transforming of the masked output, thereby forming an optical signal positioned in a plane that corresponds to the corresponding positions in the x,y plane;

(q) sensing the optical output of step (o);

(r) retrieving the first stored mask and threshold;

(s) applying the retrieved threshold to the sensed optical output of step (q);

(t) determining the x,y positions of the sensed optical signals that exceed the threshold, and classifying those patterns located at the corresponding x,y positions;

(u) removing classified objects from the unclassified set, thereby creating a remaining unclassified set of patterns; and (v) sequentially retrieving the next stored mask and threshold and applying the retrieved stored mask and threshold the diminishing remaining unclassified set of patterns until the unclassified set of patterns is classified.

9. The process of classifying unclassified patterns using a Fourier filter recognizer system as trained and defined in claim 8, comprising the steps of:

introducing unclassified patterns to the trained pattern recognition system; and retrieving the stored masks, and applying steps (a) through (h) repetitively.

10. The process of classifying unclassified patterns using a Fourier filter recognizer system as trained and defined in claim 9, comprising the steps of:

introducing unclassified patterns to the trained pattern recognition system;

modulating the light beams with the patterns; and applying the each of the stored masks and corresponding thresholds to the unclassified objects in parallel, wherein each application provides an output classified grouping.

11. The process as defined in claim 10, wherein the application of each the stored masks and corresponding thresholds produces the logical determination that all of one class have been separated from the unclassified objects.

12. A pattern recognition system comprising:

(a) a training set of objects each classified in two or more classes;

(b) means for taking data from each of the objects;

(c) means for selecting at least one discriminant space and means for computing discriminant values from the data;

(d) means for plotting the values in the discriminant space;

(e) a decision boundary associated with the discriminant space;

(f) a decision rule, defined with respect to the decision boundary, wherein at least one object in the training set is separated and correctly classified by application of the decision rule;

(g) means for removing correctly classified objects from the training set, thereby creating a remaining set of objects thereby training said pattern recognition system;

(h) means for storing the at least one discriminant space, corresponding decision boundary and decision rule;

(i) means for introducing a set of objects known to be members of the two or more classes but unclassified as to which class, to the trained pattern recognition system;

(j) means for taking data from the unclassified objects;

(k) means for retrieving the at least one stored discriminant space, decision boundary and decision rule;

(l) means for computing discriminant values from the data and plotting in the discriminant space;

(m) means for applying the decision boundary and decision rule to the plotted values;

(n) means for removing classified objects from the unclassified set; and (o) means for sequentially retrieving the next discriminant space, decision boundary and decision rule and applying them to the diminishing unclassified set of objects.

13. The system defined in claim 12, wherein the decision boundary, that is arranged to separate at least one object and correctly classify that object, is arranged to also maximize the relative distance from the boundary decision to the nearest object of a different class.

* * * * *

UNITED STATES PATENT AND TRADEMARK OFFICE
CERTIFICATE OF CORRECTION

PATENT NO.    : 6,847,731 B1
DATED         : January 25, 2005
INVENTOR(S)   : H. John Caulfield It is certified that error appears in the above-identified patent and that said Letters Patent is hereby corrected as shown below:

Column 14,
Line 50, "recognition system as comprising" should read -- recognition system comprising --

Column 16,
Line 11, "is trained; and" should read -- is trained; --
Line 14, "or zero," should read -- a zero; --
Line 16, "recognition system" should read -- recognition system; --
Line 17, "unclassified objects: should read -- unclassified objects; --
Line 19, "decision rules" should read -- decision rules; --
Line 21, "discriminant spaces" should read -- discriminant spaces; --
Line 60, "set of patterns the patterns" should read -- set of patterns, the patterns --

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,847,731 B1
DATED : January 25, 2005
INVENTOR(S) : H. John Caulfield It is certified that error appears in the above-identified patent and that said Letters Patent is hereby corrected as shown below:

Column 14,
Line 50, "recognition system as comprising" should read -- recognition system comprising --.

Column 16,
Line 11, "is trained; and" should read -- is trained; --.
Line 14, "or zero," should read -- or zero; --.
Line 16, "recognition system" should read -- recognition system; --.
Line 17, "unclassified objects: should read -- unclassified objects; --.
Line 19, "decision rules" should read -- decision rules; --.
Line 21, "discriminant spaces" should read -- discriminant spaces; --.
Line 60, "set of patterns the patterns" should read -- set of patterns, the patterns --.

This certificate supersedes Certificate of Correction issued May 31, 2005.

Signed and Sealed this

Twenty-fifth Day of October, 2005

JON W. DUDAS
*Director of the United States Patent and Trademark Office*